US012299727B2

(12) United States Patent
Nosrati et al.

(10) Patent No.: US 12,299,727 B2
(45) Date of Patent: *May 13, 2025

(54) ARTIFICIAL INTELLIGENCE MODELING TO PREDICT ELECTRONIC ACCOUNT DATA

(71) Applicant: BANK OF MONTREAL, Toronto (CA)

(72) Inventors: Seyed Masoud Nosrati, Toronto (CA); Evgene Vahlis, Toronto (CA); Seyed Hamed Yaghoubi Shahir, Toronto (CA); Bo Zhao, Toronto (CA); Nicole Langballe, Toronto (CA); Peter Poon, Toronto (CA)

(73) Assignee: BANK OF MONTREAL, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/488,938

(22) Filed: Oct. 17, 2023

(65) Prior Publication Data

US 2024/0046333 A1 Feb. 8, 2024

Related U.S. Application Data

(63) Continuation of application No. 17/225,503, filed on Apr. 8, 2021, now Pat. No. 11,798,059.
(Continued)

(51) Int. Cl.
*G06Q 30/00* (2023.01)
*G06N 3/04* (2023.01)
(Continued)

(52) U.S. Cl.
CPC .......... *G06Q 30/0631* (2013.01); *G06N 3/04* (2013.01); *G06N 5/04* (2013.01)

(58) Field of Classification Search
CPC ....... G06Q 30/06–08; G06N 3/04; G06N 5/04
See application file for complete search history.

(56) References Cited

U.S. PATENT DOCUMENTS

| 7,296,734 B2* | 11/2007 | Pliha | G06Q 40/02 235/382 |
| 11,798,059 B2* | 10/2023 | Nosrati | G06N 3/084 |

(Continued)

OTHER PUBLICATIONS

Non-Final Office Action on U.S. Appl. No. 17/225,503 dated Feb. 23, 2023 (13 pages).

(Continued)

*Primary Examiner* — Ethan D Civan
(74) *Attorney, Agent, or Firm* — Foley & Lardner LLP

(57) ABSTRACT

Disclosed methods and system describe a server that uses AI modeling to predict negative cash flow at a user level. The server periodically retrieves data associated with the user, the data comprising monetary attributes associated with one or more accounts of the user; executes a deep neural network model trained based upon historical data associated with at least a subset of the users configured to predict a negative cash flow in one or more accounts of the user, a depth of the negative cash flow, and a duration of the negative cash flow; transmits, to a second server, the predicted values, whereby when the second server determines that a likelihood of account needs satisfies a threshold, the second server establishes an electronic communication session with an electronic device of the user; trains the deep neural network when the second server establishes the electronic communication session.

16 Claims, 3 Drawing Sheets

Related U.S. Application Data

(60) Provisional application No. 63/010,743, filed on Apr. 16, 2020.

(51) Int. Cl.
*G06N 5/04* (2023.01)
*G06Q 30/0601* (2023.01)

(56) References Cited

U.S. PATENT DOCUMENTS

| | | | |
|---|---|---|---|
| 2003/0126079 A1* | 7/2003 | Roberson | G06Q 20/403 |
| | | | 705/40 |
| 2009/0210327 A1 | 8/2009 | Meidan | |
| 2016/0173693 A1* | 6/2016 | Spievak | G06Q 30/0269 |
| | | | 379/265.09 |
| 2017/0186018 A1* | 6/2017 | Nandi | G06Q 30/016 |
| 2019/0122307 A1 | 4/2019 | Sayed | |

OTHER PUBLICATIONS

Notice of Allowance on U.S. Appl. No. 17/225,503 dated Jun. 22, 2023 (9 pages).
Second Examiners Report for Canadian Patent Application No. 3114541 dated Jan. 27, 2023 (4 pages).

\* cited by examiner

ARTIFICIAL INTELLIGENCE MODELING TO PREDICT ELECTRONIC ACCOUNT DATA

CROSS-REFERENCE TO RELATED APPLICATIONS

This application is a continuation application of U.S. patent application Ser. No. 17/225,503, filed Apr. 8, 2021, which claims priority to U.S. Provisional Patent Application No. 63/010,743, filed Apr. 16, 2020, each of which is incorporated herein by reference in its entirety.

TECHNICAL FIELD

This application relates generally to generating, training, and operating artificial intelligence models.

BACKGROUND

As the processing power of computers allow for greater computer functionality and the Internet technology era allows for interconnectivity between computing systems, many organizations utilize computer technology to predict customer behavior. For instance, many banks utilize sophisticated computing systems to predict customer/account cash flow. Conventional computer-implemented methods leverage time series forecasting models to analyze account data and to determine cash flow values for users. Specifically, conventional computer-implemented methods determine a likelihood that an account will suffer from a negative balance.

Conventional software solutions and computer-implemented methods suffer from a technical shortcoming. For instance, even using state-of-the-art time series modeling techniques does not provide highly accurate results because conventional methods are typically univariate and are unable to leverage all the information available. Furthermore, conventional software solutions are limited to analyzing data at an account level because time-series models can focus on data associated with a single account. Therefore, conventional software solutions are unable to provide holistic analysis of user data. In order to combat the above-described technical shortcoming, organizations are forced to analyze each account individually, which requires high computational capacity and processing time.

SUMMARY

For the aforementioned reasons, there is a desire for an improved software solution and computer-implemented technique that uses artificial intelligence to predict user behavior. There is a desire to develop a customized multivariate deep neural network to analyze predict a user's account balance based on all users' account data, and not limited to a single account. There is a desire to implement and execute a single analytical protocol that reduces the computing resources and time needed by conventional software solutions.

In an embodiment, a method comprises periodically retrieving, by a server, data associated with a user from a set of users, the data comprising monetary attributes associated with one or more accounts of the user; executing, by the server, an artificial intelligence model to predict a first value indicating a negative cash flow in one or more accounts of the user, a second value indicating a depth of the negative cash flow, and a third value indicating a duration of the negative cash flow, wherein the artificial intelligence model is trained based upon historical data associated with at least a subset of users within the set of users; transmitting, by the server to a second server, the first value, the second value, and the third value, whereby the second server: executes an analytical model to determine a likelihood of account needs associated with the user; determines that the likelihood of account needs satisfies a threshold; and establishes an electronic communication session with an electronic device of the user.

In another embodiment, a system comprises a server in communication with a second server in communication with an electronic device of a user, the server configured to: periodically retrieve data associated with the user from a set of users, the data comprising monetary attributes associated with one or more accounts of the user; execute an artificial intelligence model to predict a first value indicating a negative cash flow in one or more accounts of the user, a second value indicating a depth of the negative cash flow, and a third value indicating a duration of the negative cash flow, wherein the artificial intelligence model is trained based upon historical data associated with at least a subset of users within the set of users; transmit, to the second server, the first value, the second value, and the third value, whereby the second server is configured to: execute an analytical model to determine a likelihood of account needs associated with the user; determine that the likelihood of account needs satisfies a threshold; and establish an electronic communication session with the electronic device of the user.

BRIEF DESCRIPTION OF THE DRAWINGS

Non-limiting embodiments of the present disclosure are described by way of example with reference to the accompanying figures, which are schematic and are not intended to be drawn to scale. Unless indicated as representing the background art, the figures represent aspects of the disclosure.

DETAILED DESCRIPTION

Figure 1:
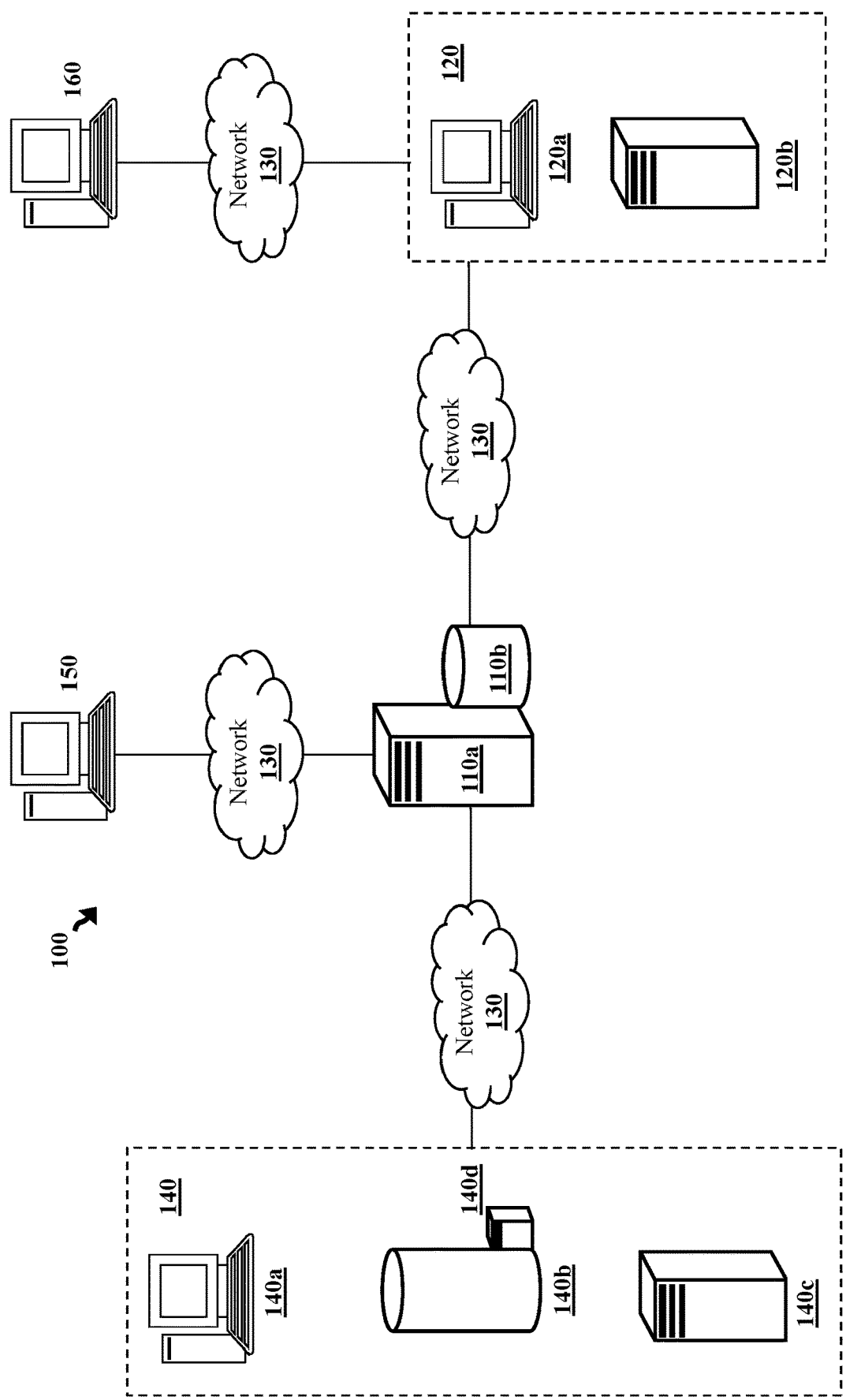
FIG. 1 illustrates components of an artificial intelligence (AI) enabled electronic account prediction system, according to an embodiment.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

FIG. 1 illustrates components of an AI-enabled electronic account prediction system 100. The system 100 may include an analytics server 110*a*, system database 110*b*, organization computing devices and server's 120*a-d* (collectively organization computing devices 120), electronic data sources 140*a-c* (collectively electronic data source 140), an administrator computing device 150, and client computing device 160. The above-mentioned components may be connected to each other through a network 130. The examples of the network 130 may include, but are not limited to, private or public LAN, WLAN, MAN, WAN, and the Internet. The network 130 may include both wired and wireless communications according to one or more standards and/or via one or more transport mediums.

The communication over the network 130 may be performed in accordance with various communication protocols such as Transmission Control Protocol and Internet Protocol (TCP/IP), User Datagram Protocol (UDP), and IEEE communication protocols. In one example, the network 130 may include wireless communications according to Bluetooth specification sets, or another standard or proprietary wireless communication protocol. In another example, the network 130 may also include communications over a cellular network, including, e.g., a GSM (Global System for Mobile Communications), CDMA (Code Division Multiple Access), EDGE (Enhanced Data for Global Evolution) network.

The system 100 is not confined to the components described herein and may include additional or alternate components, not shown for brevity, which are to be considered within the scope of the embodiments described herein.

The analytics server 110*a* may generate and display an electronic platform configured to use various AI models to display predicted results. The electronic platform may include graphical user interface (GUI) displayed on each organization computing device 120 and/or the administrative computing device 150. An example of the electronic platform generated and hosted by the analytics server 110*a* may be a web-based application or a website configured to be displayed on different electronic devices, such as mobile devices, tablets, personal computer, and the like (e.g., client computing device 160 and/or organization computing devices 120).

As will be describe below, the analytics server 110*a* may receive an instruction to execute various analytical protocols, such as the AI model, from a user operating the GUI. In some configurations, the analytics server 110*a* may be programmed, such that it would periodically collect data and automatically generate user-specific predictions. In some configurations, the analytics server 110*a* may be programmed, such that it would generate the prediction based on one or more satisfied thresholds. For instance, the analytics server 110*a* may only predict a user's account data when the user has a number of transactions that satisfies one or more thresholds (e.g., number of transactions that is higher or lower than a pre-determined threshold, an account balance that satisfies a pre-determined threshold, or personal/demographic data that satisfies a pre-determined threshold).

The analytics server 110*a* may host a website accessible to end-users, where the content presented via the various webpages may be controlled based upon each particular user's role or viewing permissions. The analytics server 110*a* may be any computing device comprising a processor and non-transitory machine-readable storage capable of executing the various tasks and processes described herein. Non-limiting examples of such computing devices may include workstation computers, laptop computers, server computers, laptop computers, and the like. While the system 100 includes a single analytics server 110*a*, in some configurations, the analytics server 110*a* may include any number of computing devices operating in a distributed computing environment.

The analytics server 110*a* may execute software applications configured to display the electronic platform (e.g., host a website), which may generate and serve various webpages to each organization computing device 120. Different users operating the organization computing devices 120 may use the website to view and/or interact with the predicted results.

In some implementations, the analytics server 110*a* may be configured to require user authentication based upon a set of user authorization credentials (e.g., username, password, biometrics, cryptographic certificate, and the like). In such implementations, the analytics server 110*a* may access the system database 110*b* configured to store user credentials, which the analytics server 110*a* may be configured to reference in order to determine whether a set of entered credentials (purportedly authenticating the user) match an appropriate set of credentials that identify and authenticate the user.

The analytics server 110*a* may also store data associated with each user operating one or more organization computing devices 120. The analytics server 110*a* may use the data to identify various interactions while training various AI models accordingly. For instance, the analytics server 110*a* may monitor how one or more users (e.g., a user operating the administrative computer 150, a user operating the organization computer 120*a*, and/or the organization server 120*b*) interact with the predicted results. The analytics server 110*a* may then use the interactions data to train the AI model accordingly. In a non-limiting example, when the predicted results are ignored by a user operating the organization computer 120*a*, and/or the administrative computer 150, the analytics server may user various back-propagation techniques to train the Ai model accordingly.

In some configurations, the analytics server 110*a* may generate and host webpages based upon a particular user's role within the system 100 (e.g., administrator, employee, and/or bidder). In such implementations, the user's role may be defined by data fields and input fields in user records stored in the system database 110*b*. The analytics server 110*a* may authentication the user and may identify the user's role by executing an access directory protocol (e.g. LDAP). The analytics server 110*a* may generate webpage content that customized according to the user's role defined by the user record in the system database 110*b*.

The analytics server 110*a* may retrieve information from a user (or retrieve from a data repository), analyze the data, and display the results (e.g., AI-based results) on the electronic platform. As described herein, the electronic platform may be accessed by the organization computer 120*a* and/or administrative computer 150. For instance, in a non-limiting example, a user operating the organization computing device 120*b* may transmit a request to the analytics server 110*a* to predict account data associated with John Smith using the electronic platform. The analytics server 110*a* may then use various AI models (stored within the system database 110*b*) to analyze John Smith's account data. The analytics serve 110*a* may then display the results (e.g., likelihood of negative cash flow, duration of the negative cash flow, and/or the depth of the negative cash flow) via the electronic platform.

Organization computing devices 120 may be any computing device comprising a processor and a non-transitory machine-readable storage medium capable of performing the various tasks and processes described herein. Non-limiting examples of a network node may be a workstation computer, laptop computer, tablet computer, and server computer. In operations, various users may organization computing devices 120 to access the GUI operationally managed by the analytics server 110*a*.

The organization server 120*b* may be any computing device comprising a processor and non-transitory machine-readable storage capable of executing the various tasks and processes described herein. Non-limiting examples of such computing devices may include workstation computers, laptop computers, server computers, laptop computers, and the like. While the system 100 includes a single organization server 120*b*, in some configurations, the organization server 120*b* may include any number of computing devices operating in a distributed computing environment.

The organization server 120*b* may represent a server of an organization that is responsible for transmitting notification and electronic communications to various users (e.g., employees and/or customers). In some configurations, the organization server 120*b* may receive the predicted values from the analytics server 110*a*, perform further analytical protocols, and establish an electronic communication session with the user's device. For instance, when the analytics server 110*a* transmits one or more values/scores indicating that John Smith's accounts will have a negative cash flow of $100 for 15 days, the organization server 120*b* may compare John Smith's demographic attributes against various predetermined rules/thresholds and identify an appropriate product (e.g., overdraft protection). The organization server 120*b* may also transmit an electronic notification (e.g., pop up message, e-mail, and/or push notification) to John Smith's electronic device (e.g., computer and/or mobile device).

The electronic data sources 140 may represent various electronic data sources that contain data associated with the organizations users, such as account data. For instance, database 140*c* and/or server 140*b* may represent data sources providing the corpus of data (e.g., historical account data) needed for the analytics server 110*a* to train one or more AI models. The electronic data sources 140 may also provide user's current account attributes (e.g., balances) used to execute the AI models and to predict data for a particular user. In some configurations, account data may be inputted by an employee using the electronic platform (generated and maintained by the analytics server 110*a*) and displayed on the employee computer 140*a*.

The administrator computing device 150 may represent a computing device operated by a system administrator. The administrator computing device 150 may be configured to display various analytic metrics where the system administrator can monitor the AI training, review feedback, and modify various thresholds/rules described herein. For instance, an administrator can revise precision and/or accuracy metrics generated by the analytics server 110*a* executing the AI model.

In operation, the analytics server 110*a* may analyze the data using AI modeling techniques and display the results on the electronic platform. For instance, a user operating the client computing device 160 may log into an application provided by the analytics server where the user can view a likelihood of the user's account suffering from a negative cash flow. The client computing device 160 may represent a computing device operated by the end user (e.g., account holder). The client computing device 160 may be configured to display various analytic metrics, such as the cash flow values described herein.

Figure 2:
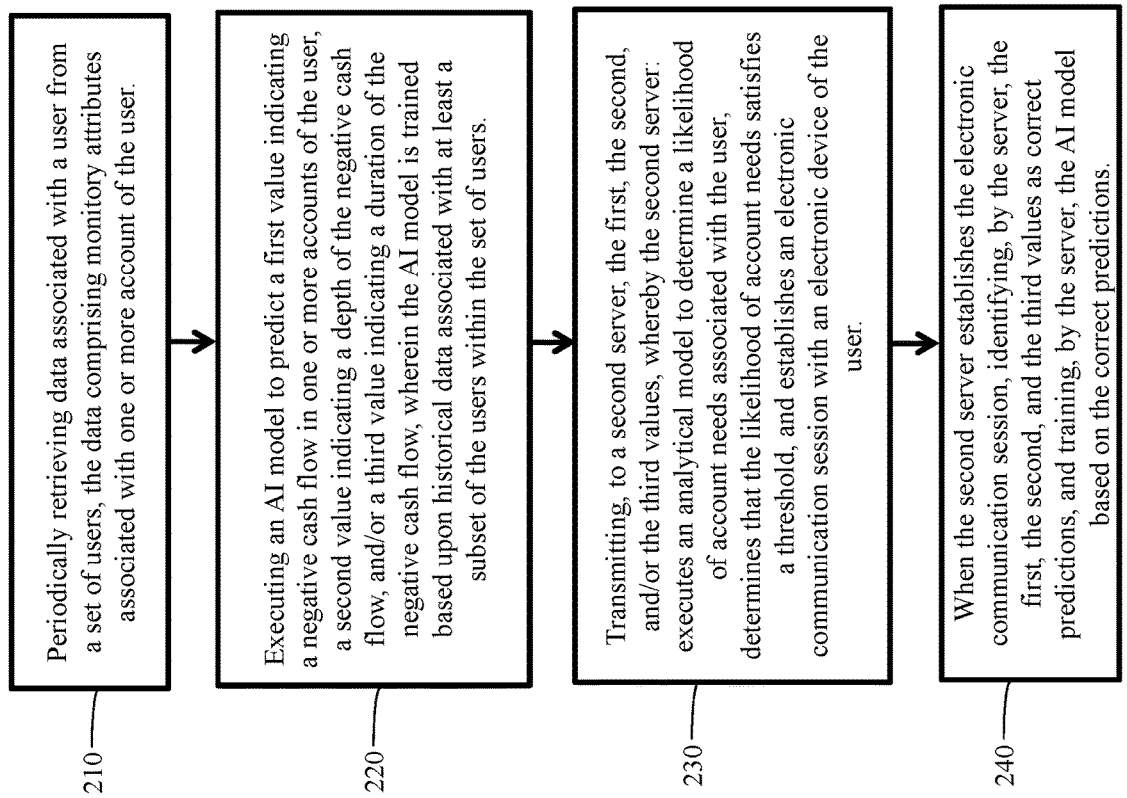
FIG. 2 illustrates a flow diagram of a process executed in the AI-enabled electronic account prediction system, according to an embodiment.

FIG. 2 illustrates a flow diagram of a process executed in an AI-enabled electronic account prediction system, according to an embodiment. The method 200 includes steps 210-240. However, other embodiments may include additional or alternative execution steps, or may omit one or more steps (or any part of the steps) altogether. The method 200 is described as being executed by a server, similar to the analytics server described in FIG. 1. However, one or more steps of method 200 may also be executed by any number of computing devices operating in the distributed computing system described in FIG. 1. For instance, one or more user computing devices may locally perform part or all the steps described in FIG. 2.

Even though some aspects of the embodiments described herein are described within the context of bank accounts, it is expressly understood that methods and systems described herein apply to all AI models and training techniques. For instance, the method 200 may be used to predict other user behavior for account other than bank accounts.

At step 210, the analytics server may periodically retrieve data associated with a user from a set of users, the data comprising monetary attributes associated with one or more accounts of the user.

The analytics server may receive an instruction to predict cash flow values associated with a user within a set of users. The analytics server may receive the instruction using a variety of methods or a combination of the methods described herein. In one embodiment, an employee (or an account holder) may access the electronic platform generated/maintained by the analytics server and electronically submit a request for the analytics server to determine cash flow values for a user (e.g., account holder). In another embodiment, the analytics server may periodically (e.g., once a week or once a month) analyze account data for all (or a subset of) the users (e.g., account holders).

In another embodiment, the analytics server may use one or more rules and predetermined thresholds to analyze account data of one or more users and determine their corresponding cash flow values. For instance, the analytics server may periodically analyze user/account attributes (e.g., account data) of a user within the predetermined time (e.g., 6 months) after the user has opened a new account. In another example, the analytics server may analyze account data for a user if data associated with the user or the account satisfies a threshold (e.g., account balance is lower or higher than a threshold).

When the analytics server receives instructions to analyze user data, the analytics server retrieves a user identifier associated with the user. The user identifier may be any data that uniquely identifies the user, such as the user's social security number, account number, or other identification data. The analytics server may then query one or more internal/external databases and retrieve user data associated with the user. For instance, the analytics server may query an internal database (using the user identifier) and retrieve user's demographic data (e.g., user's age, income, job, income potential, number of other accounts, number of retirement accounts, and/or gender). In some configurations, the analytics server may enrich the data using a third party (external) database.

The analytics server may also query one or more databases to retrieve account data associated with the user's accounts. The account data may include monetary attributes including account balances and transaction data (e.g., transaction amount, whether the transaction is a credit or a debit to the user's account, timestamp of the transaction, and merchant data). As described above, the analytics server may retrieve all account data associated with the user because the analytics server may analyze cash flow values at a user level and not at an account level. This allows the analytics server to comprehensively identify whether one or more accounts associated with the user will suffer from a negative cash flow.

At step 220, the analytics sever may execute an artificial intelligence model to predict a first value indicating a negative cash flow in one or more accounts of the user, a second value indicating a depth of the negative cash flow, and/or a third value indicating a duration of the negative cash flow, wherein the AI model is trained based upon historical data associated with at least a subset of the users within the set of users. Even though aspects of the concepts described herein are described in the context of deep neural networks, the methods and systems described herein are not limited to deep neural networks. Therefore, the methods described herein can be executed via any artificial intelligence and machine learning method.

The analytics server may execute an AI model to predict cash flow data associated with the user. The analytics server may use the retrieved data (step 210) to predict three values for the user. The first value may indicate a negative cash flow in one or more accounts associated with the user. The first value may identify one or more accounts of the user and indicate that the AI model predicts that the account will suffer from a negative account balance. The second value may indicate a depth of the negative cash flow. The second value may identify a predicted negative balance for one or more accounts associated with the user. The third value may indicate a duration of the negative balance. For instance, the AI model may predict that a user's checking account will have a negative balance of $150 for 8 days. The AI model may predict one, two, or all three values. Therefore, the calculations may not always result in all the values.

The AI model may utilize a deep neural network model trained based upon historical customer data to predict future cash flow values, e.g., the user's possible negative cash flow. The AI model may use a machine-learning algorithm, such as a deep neural network, that uses multiple layers of interconnected artificial neural networks (convolutional neural networks or CNN). Each layer of neural networks (nodes) may learn to transform the data inputs (e.g., historical customer data and/or data retrieved in step 210) into an incrementally more abstract and composite representation of the data. The deep neural network model used by the AI model may correspond to this layer-by-layer method. When comprehensively executed, the AI model may identify important variables that affect the outcome. The AI model may have a number of layers through which the data is transformed from its initial state (e.g., raw transaction data) into the cash flow value predictions. The AI model may use a credit assignment path depth (e.g., chain of transformations from input to output that defines connections between input and output) to predict the cash flow values.

The AI model may determine a non-linear (multi-variable) path/equation that calculates the cash flow values. The non-linear equation may identify hidden patterns within a user's transaction data that are nearly impossible (impractical) for a human to identify using pen and paper or other non-AI-related methods, such as rule-based or threshold-based methods. The hidden patterns identified within a user's transaction may correspond to hidden patterns within the historical data (training datasets). The AI model may then apply the identified hidden patterns to new user's account data to predict future data. Therefore, the AI model may use historical ground-truth data (e.g., to predict cash flow values associated with the user and his/her accounts.

The analytic server may initially train the AI model using historical customer data. When the analytics server initially trains the AI model, the AI model is ready to be executed and to predict future results. As will be described below, the analytics server may also monitor the predicted data and may re-train the AI model using back-propagation methods, as described in step 240.

In the initial training period, the analytics server may retrieve ground-truth data and generate a training dataset accordingly. The ground truth data may represent data for which the attributes are known and the AI model can safely assume the results. A non-limiting example of the ground-truth data may be a training dataset that corresponds to previous transactions conducted by other users/customers. For instance, the analytics server may query multiple databases to retrieve millions of previously conducted transactions and account data to initially train the model. In some configurations, the analytics server may initiate one or more application programming interfaces to generate a pipeline of data to train the AI model.

To decrease training time, the analytics server may use a distributed training method to train the AI model. The pipeline of data allows for distribution of the model training over multiple machines. The analytics server may balance reducing training time by using the distributed training methods and maintaining high accuracy of the AI model.

Figure 3:
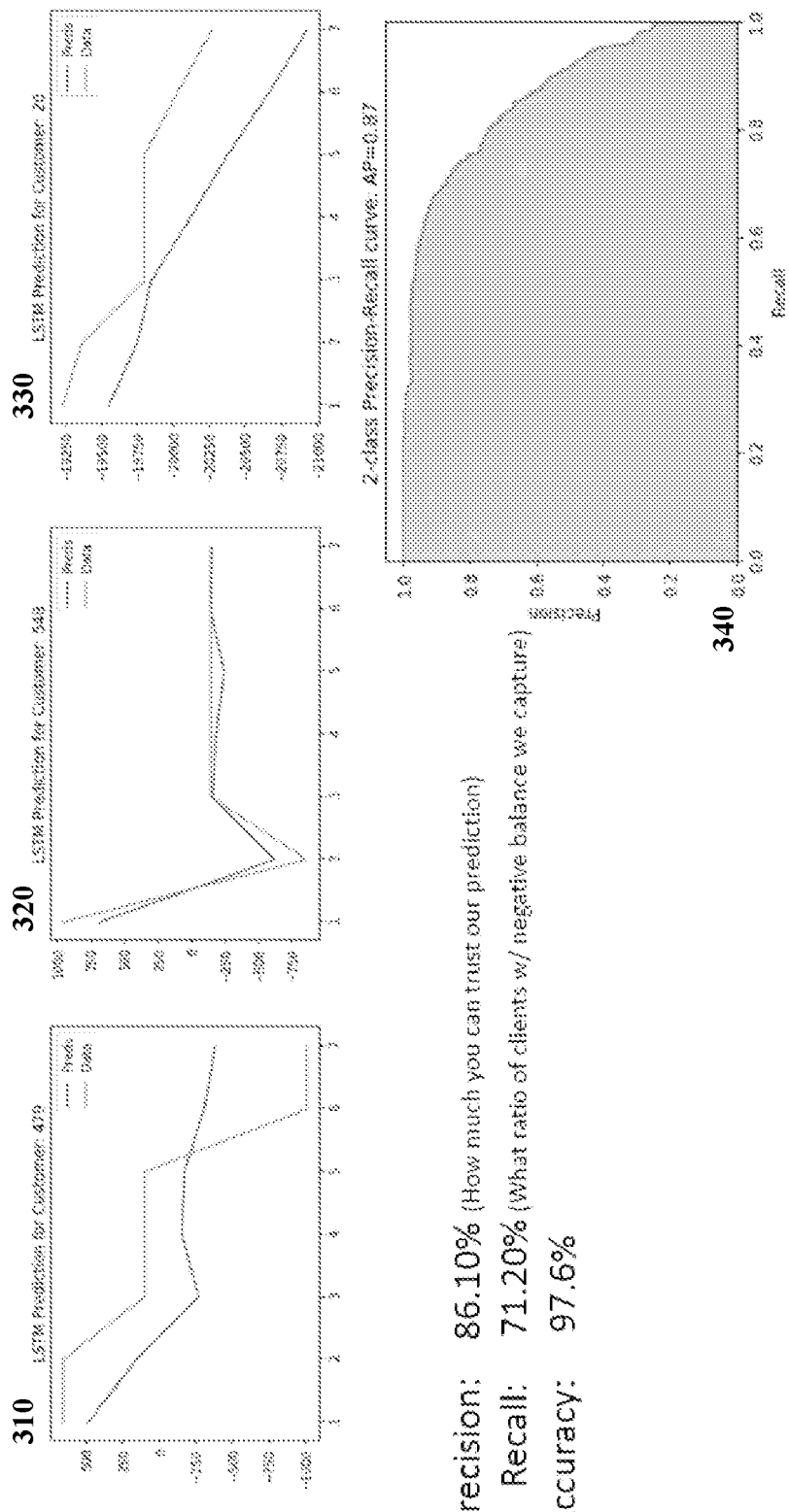
FIG. 3 illustrates AI training metrics, in accordance with an embodiment.

When the analytics server completes the initial training period, the AI model is configured to analyze historical transactions and account balances to establish patterns that can predict the user's future cash shortfalls. The AI model may continuously run in the background and may be set to achieve 97% accuracy in its predictions, as depicted in FIG. 3. A system administrator can revise this accuracy metric.

Referring now to FIG. 3, graphs 310-330 represent data for customers compared with predicted data using a trained AI model. Graph 340 represents an accuracy of the trained model where the precision and recall values of the trained model are compared against each other. While precision of the trained model may refer to a ratio between a true positive results and an actual result, recall value may refer to a ratio between true positive results and the predicted results. Simply put, the precision value corresponds to the percentage of AI model's results, which are relevant. In contrast, the recall value refers to the percentage of total relevant results correctly classified by the trained AI model. The analytics server may train the AI model based on various predetermined rules and thresholds. For instance, the analytics server may train the AI model, such that precision, recall, and/or accuracy values satisfy predetermined and/or revisable thresholds.

Analyzing data across a user's multiple accounts allows the AI model to more accurately determine the users that require a loan (or overdraft protection) rather than users who simply need to transfer funds from one of their account to cover an unforeseen expense. This capability would not be possible if the AI model is trained to identify cash flow values based on transaction data associated with a single account (e.g., account level analysis).

Referring back to FIG. 2, when the training of the AI model is completed, the analytics server may execute the AI model where the AI model uses the data retrieved in step 210 to predict one, two, or three values associated with the user. The first value may identify one or more accounts of the user and indicate that the AI model predicts that the account will suffer from a negative account balance. For instance, the AI model my output a likelihood of 80% that a user's savings account will suffer from a negative balance within the next week. The second value may indicate a depth of the negative cash flow. The second value may identify a predicted negative balance for one or more accounts associated with the user. For instance, the second value may indicate that the user's savings account may have a negative $200 balance. The third value may indicate a duration of the negative balance. For instance, the AI model may predict that the user's account will have the predicted negative balance for at least 10 days.

At step 230, the analytics server may transmit, to a second server, the first, the second, and/or third values, whereby the second server: executes an analytical model to determine a likelihood of account needs associated with the user, determines that the likelihood of account needs satisfies a threshold, and establishes an electronic communication session with an electronic device of the user.

The analytics server may display the predicted value on an electronic device, such as an administrator's computing device or a banker's computing device. In some embodiments, the analytics server may display the predicted values on an electronic device associated/operated by the user. For instance, when a user logs into a mobile banking application, the analytics server may present the user with an insight informing them of a potential cash shortfall. The user can review the amount and duration of the shortfall, along with an explanation of why the shortfall may happen.

Additionally or alternatively, the analytics server may transmit the values generated by the AI model to one or more servers, such as a bank server, call center server, or a third-party server. The second server may then analyze the predicted values and perform an action based on this analysis. In some configurations, the second server may determine that the predicted values are not indicative of a cash flow problem. As a result, the second server may perform no action and may not send any notifications to any other devices. In some configurations, the analytics server may determine that the outputted values indicate a legitimate risk of cash flow problems. The second server may then select a suitable product (e.g., overdraft protection services).

The second server may use a variety of preexisting rules and thresholds to first calculate a likelihood of account needs. For instance, the second server may execute various analytical protocols to calculate the likelihood of account needs, based on the predicted values received from the AI model. The likelihood of account needs may correspond to a likelihood of the user needing assistance to combat the predicted financial shortfall. If the likelihood of account needs satisfies a predetermined threshold, the second server may then identify the suitable product. For instance, the second server may only transmit the suitable product when at least one (or more) of the predicted values (or the likelihood value) satisfies a threshold. For instance, the second server may only transmit an overdraft protection recommendation when the predicted likelihood of negative cash flow is more than 75%. In some configurations, the second server may only establish the electronic communication session (e.g., telephone call, email, and/or push notification) when the user's demographic information exceed a predetermined threshold.

In some configurations, the analytics server causes/instructs the second server to perform one or more of the actions described herein. For instance, the analytics server may send a set of electronic instructions to the second server, along with the predicted values, where the electronic instructions cause the second server to perform various actions. For instance, the analytics sever may instruct the second server to calculate a likelihood of account needs or execute other analytical protocols, such as comparing the predicted cash flow values against various thresholds. In another example, when the likelihood of account needs satisfy a threshold, the analytics server may cause the second server to establish the electronic communication session with the user/client device.

In some configurations, the second server may be a server associated with a call center. When a user (customer) calls the call center, the analytics server may execute AI model and predict the first, second, and/or third values. Using the predicted values, the second server may route the customer's call to a particular agent. For instance, if the customer is predicted have a negative cash flow that satisfies a threshold, the customer's call me routed differently (to an agent who specializes in such customers).

At step 240, when the second server establishes the electronic communication session, the analytics server may identify the first, the second, and/or the third values as correct predictions, and train the AI model based on the correct predictions. The analytics server train the AI when the second server establishes the electronic communication session, whereby when the second server establishes the electronic communication session with the electronic device of the user, the server identifies the first, the second, and/or the third values as correct (or incorrect) predictions. The analytics server may monitor the electronic device to identify interactions between the second server (e.g., employees) and the electronic device while the electronic device is outputting the predicted results. When the analytics server outputs the predicted results onto one or more user electronic devices, the analytics server may monitor the user's interactions with the results. As will be described below, the analytics server may then train the AI model based on the monitored data.

When the user performs an activity on the electronic platform, the analytics server may track and record details of the user's activity. For instance, when a predicted result is displayed on the user electronic device (e.g., electronic platform), the analytics server may monitor to identify whether the user (employee) has accepted, rejected, or revised the predicted results by editing, deleting, accepting, or revising the results. The analytics server may also identify a timestamp of each interaction, such that the analytics server records the frequency of modification, duration of revision/correction.

The analytics server may utilize an application programming interface (API) to monitor the user's activities. The analytics server may use an executable file to monitor the user's electronic device. The analytics server may also monitor the electronic platform displayed on an electronic device via a browser extension executing on the electronic device. The analytics server may monitor multiple electronic devices and various applications executing on the electronic devices. The analytics server may communicate with various electronic devices and monitor the communications between the electronic devices and the various servers executing applications on the electronic devices.

In some configurations, the analytics server may monitor the electronic device using an executable file (application) installed as a browser extension. The browser extension (executable file) may be executing as a background process of the electronic device. For instance, the browser extension may be transparent to the user operating the electronic device. In this way, the analytics server is able to monitor the user's activities without disturbing the user and/or obfuscating the display screen of the electronic device. In some embodiments, the analytics server may activate a monitoring module (e.g., browser extension or executable file) upon outputting the results on the electronic platform.

When the predicted results is transmitted to the second server, the analytics server may also monitor the second server's output. For instance, the analytics server may determine that the predicted results were accepted (correct) when an overdraft protection was transmitted to the user or an electronic communication session was established with the user's device. In contrast, if the second server (or any other server or electronic device) did not act upon the predicted result by contacting the user or transmitting product recommendations to the user, the analytics server determines that the predicted results were not satisfactory. Therefore, the analytics server may train the model accordingly.

The analytics server may use the data collected/monitored to train the AI model and improve its predicted results. The analytics server may use various back-propagation technique to further train the AI model.

The analytics server may display a prompt requesting the users to provide feedback regarding the predicted results outputted by the analytics server. For instance, the analytics server may display a prompt having an input element (e.g., text string input, drop down menu, radio button). The end user may interact with the prompt to input a feedback regarding the accuracy of the results outputted by the analytics server.

In some configurations, the analytics server may cause a webserver to revise a website based on the results predicted by the AI model. For instance, if a user is predicted to have a negative balance and if a satisfactory product is identified, the analytics server may then revise (or instruct a webserver to revise) a website (e.g., a bank's website) to include an offer associated with the product. For instance, the analytics server may display a pop up window that displays the offer. When the user clicks on the pop up window, the analytics server may direct the user to a page that displays information associated with the product.

Non-Limiting Example

An analytics server may receive an instruction to analyze data associated with a user's account. The analytics server queries multiple internal databases using the user's unique identifier and determines that the user has three accounts (two savings accounts and one checking account). The analytics server then retrieves transaction data associated with each account. The analytics server then executes an AI model that uses deep neural networks to predict cash flow values for the user. The AI model is previously trained using other customers' historical transaction and account data. The analytics server may execute the AI model using the retrieved user data and may predict three cash flow values for the user. Specifically, the analytics server may determine that the user's checking account will likely suffer from a negative balance of $150 for a week before the negative cash flow is rectified.

The analytics server may display this information onto the user's electronic device. For instance, when the user logs into a mobile banking application, the analytics server may display a notification indicating that the user's checking account is predicted to have a negative balance. The analytics server may also transmit the predicted cash flow values to a bank server where the bank server analyzes the prediction values and compares them against pre-determined thresholds and rules. If the bank server determines a suitable product for the user. For instance, the bank server may calculate a likelihood of account needs for the user and determine that the user is in need of over protection services. The bank server may then transmit a notification to the user. The bank server can also deny one or more transactions requested by the user.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination

What we claim is:

1. A method comprising:
   generating, by a server, a training dataset comprising historical monetary data associated with a set of accounts comprising account activity of each account indicating whether each account within the set of accounts included a negative cash flow, a depth of the negative cash flow, and a duration of the negative cash flow;
   training, by the server, an artificial intelligence model using the training dataset;
   retrieving, by the server, a monetary attribute associated with an account of a user;
   executing, by the server, the artificial intelligence model to predict a first value indicating a negative cash flow in the account of the user, a second value indicating a depth of the negative cash flow, and a third value indicating a duration of the negative cash flow;
   identifying, by the server, the first value, the second value, or the third value as correct predictions;
   training, by the server, the artificial intelligence model based on the correct predictions; and
   transmitting, by the server, an indication that at least one of the first value, the second value, or the third value satisfies a threshold.

2. The method of claim 1, further comprising:
   transmitting, by the server to a second server, the first value, the second value, or the third value, whereby the second server:
      executes an analytical model to determine a likelihood of account needs associated with the account of the user; and
      establishes an electronic communication session with an electronic device of the user.

3. The method of claim 1, wherein the server further retrieves user attributes associated with the user other than the monetary attribute associated with the account of the user, wherein the server applies the retrieved user attributes to the artificial intelligence model.

4. The method of claim 3, wherein the user attributes comprise at least one of user's demographic data, user's income data, or user's account type.

5. The method of claim 1, wherein the artificial intelligence model is a deep neural network.

6. The method of claim 2, wherein the second server identifies a product to be offered to the user based on the likelihood of account needs.

7. The method of claim 1, wherein the server is associated with a call center, and wherein the server establishes an electronic communication session with an electronic device of the user by routing a call received from the electronic device of the user based on at least one of the first value, the second value, or the third value.

8. The method of claim 1, further comprising:
   denying, by the server, at least one transaction associated with the user.

9. A system comprising:
   a computer-readable medium having a set of instructions that when executed cause a processor to:
      generate a training dataset comprising historical monetary data associated with a set of accounts comprising account activity of each account indicating whether each account within the set of accounts included a negative cash flow, a depth of the negative cash flow, and a duration of the negative cash flow;
      train an artificial intelligence model using the training dataset;
      retrieve a monetary attribute associated with an account of a user;
      execute the artificial intelligence model to predict a first value indicating a negative cash flow in the account of the user, a second value indicating a depth of the negative cash flow, and a third value indicating a duration of the negative cash flow;
      identify the first value, the second value, or the third value as correct predictions;
      train the artificial intelligence model based on the correct predictions; and
      transmit an indication that at least one of the first value, the second value, or the third value satisfies a threshold.

10. The system of claim 9, wherein the set of instructions further cause the processor to:
    transmit, to a second server, the first value, the second value, or the third value, whereby the second server:
       executes an analytical model to determine a likelihood of account needs associated with the account of the user; and
       establishes an electronic communication session with an electronic device of the user.

11. The system of claim 9, wherein the set of instructions further cause the processor to retrieve user attributes associated with the user other than the monetary attribute associated with the account of the user, wherein the server applies the retrieved user attributes to the artificial intelligence model.

12. The system of claim 11, wherein the user attributes comprise at least one of user's demographic data, user's income data, or user's account type.

13. The system of claim 9, wherein the artificial intelligence model is a deep neural network.

14. The system of claim 10, wherein the second server identifies a product to be offered to the user based on the likelihood of account needs.

15. The system of claim 10, wherein the processor is associated with a call center, and wherein the set of instructions further cause the processor to establish an electronic communication session with an electronic device of the user by routing a call received from the electronic device of the user based on at least one of the first value, the second value, or the third value.

16. The system of claim 9, wherein the set of instructions further cause the processor to deny at least one transaction associated with the user.

\* \* \* \* \*